United States Patent [19]

Chang et al.

[11] Patent Number: 5,552,128
[45] Date of Patent: *Sep. 3, 1996

[54] SELECTIVE CATALYTIC REDUCTION OF NITROGEN OXIDES

[75] Inventors: Clarence D. Chang, Princeton, N.J.; Jose G. Santiesteban, Yardley, Pa.; David S. Shihabi, Pennington, N.J.; Scott A. Stevenson, Langhorne; James C. Vartuli, Westchester, both of Pa.

[73] Assignee: Mobil Oil Corporation, Fairfax, Va.

[ * ] Notice: The term of this patent shall not extend beyond the expiration date of Pat. No. 5,401,478.

[21] Appl. No.: 410,156

[22] Filed: Mar. 24, 1995

Related U.S. Application Data

[63] Continuation-in-part of Ser. No. 100,940, Aug. 3, 1993, Pat. No. 5,401,478.

[51] Int. Cl.⁶ ........................................ B01D 53/56
[52] U.S. Cl. ........................................ 423/235; 423/239.1
[58] Field of Search .................. 423/235, 235 D, 423/236, 237, 239.1, 239.2

[56] References Cited

U.S. PATENT DOCUMENTS

| | | | |
|---|---|---|---|
| 4,081,510 | 3/1978 | Kato et al. | 423/237 |
| 4,778,665 | 10/1988 | Krishnamurthy et al. | 423/239 |
| 4,789,531 | 12/1988 | Eichholtz et al. | 423/235 |
| 4,792,439 | 12/1988 | Schneider et al. | 423/239 |
| 4,812,430 | 3/1989 | Child | 502/42 |
| 4,918,041 | 4/1990 | Hollstein et al. | 502/217 |
| 4,929,586 | 5/1990 | Hegedus et al. | 502/217 |
| 5,113,034 | 5/1992 | Soled et al. | 585/510 |
| 5,143,707 | 9/1992 | Beck et al. | 423/239 |
| 5,157,199 | 10/1992 | Soled et al. | 585/750 |
| 5,336,476 | 8/1994 | Kintaichi et al. | 423/239.1 |
| 5,345,026 | 9/1994 | Chang et al. | 585/700 |
| 5,382,731 | 1/1995 | Chang et al. | 585/315 |
| 5,401,478 | 3/1995 | Chang et al. | 423/235 |

FOREIGN PATENT DOCUMENTS

| | | |
|---|---|---|
| 0277765 | 1/1988 | European Pat. Off. . |
| 0516262A1 | 6/1989 | European Pat. Off. . |
| 0585065A1 | 8/1992 | European Pat. Off. . |
| 3632720C1 | 4/1988 | Germany . |
| 63-143941 | 8/1986 | Japan . |
| 1288339 | 11/1989 | Japan . |
| 61-90276 | 7/1994 | Japan . |
| WO94/14732 | 7/1994 | WIPO . |

OTHER PUBLICATIONS

Iglesia, E., Soled, S. L., and Kramer, G. M. Isomerization of Alkanes on Sulfated Zirconia: Promotion by Pt and by Adamantyl Hydride Transfer Species, Journal of Catalysis 144, 238–253 (1993) Nov.

Hino M. et al., "Synthesis of Solid Superacid of Tungsten Oxides Supported on Zirconia and its Catalytic Action for Reactions of Butane and Pentane," J. Chem. Soc., Chem Commun., 1259–1260 (Sep. 1988).

Proceedings 9th Intern. Congress on Catalysis, vol. 4, Oxide Catalyst and Catalyst Development, M. J. Phillips et al., ed., 1727–1734 (Jun. 1988).

Hsu, C. Y., Heimbuch, C. R. Armes, C. T., and Gates, B. C., "A Highly Active Solid Superacid Catalyst for n–Butane Isomerization: A Sulfated Oxide Containing Iron, Manganese and Zirconium," J. Chem. Soc., Commun., 1645 (Nov. 1992).

*Primary Examiner*—Gary P. Straub
*Assistant Examiner*—Timothy C. Vanoy
*Attorney, Agent, or Firm*—Ronald A. Bleeker; Dennis P. Santini; Lori F. Cuomo

[57] ABSTRACT

There is provided a catalytic method for converting nitrogen oxides to nitrogen (i.e., $N_2$). The catalyst for this method comprises an acidic solid component comprising a Group IVB metal oxide modified with an oxyanion of a Group VIB metal and further comprising at least one metal selected from the group consisting of Group IB, Group IVA, Group VB, Group VIIB, Group VIII, and mixtures thereof. An example of this catalyst is zirconia, modified with tungstate, and iron. This method may be used for reducing emissions of nitrogen oxides from waste gases, including industrial exhaust gases and automobile exhaust gases. In a particular embodiment, nitrogen oxides in waste gases may be reacted with ammonia before the waste gases are discharged to the atmosphere.

14 Claims, No Drawings

SELECTIVE CATALYTIC REDUCTION OF NITROGEN OXIDES

CROSS REFERENCE TO RELATED APPLICATIONS

This application is a continuation in part of U.S. application Ser. No. 08/100,940, filed Aug. 3, 1993 now U.S. Pat. No. 5,401,478, incorporated herein in its entirety by reference.

BACKGROUND

There is provided a catalytic method for converting nitrogen oxides to nitrogen (i.e., $N_2$). The catalyst for this method comprises an acidic solid comprising a Group IVB metal oxide modified with an oxyanion of a Group VIB metal. This method may be used for reducing emissions of nitrogen oxides from waste gases, including industrial exhaust gases and automobile exhaust gases. In a particular embodiment, nitrogen oxides in waste gases may be reacted with ammonia before the waste gases are discharged to the atmosphere.

A number of oxides of nitrogen are known which are relatively stable at ambient conditions and two of these, nitric oxide (NO) and nitrogen dioxide ($NO_2$) are principal contributors to atmospheric pollution. In this specification, they are referred to generically as $NO_x$ for convenience. They are usually formed in internal combustion engines as well as in furnaces, boilers, and incinerators in which high temperature combustion processes occur. Although the concentrations of $NO_x$ in the exhaust gases of these combustion processes are relatively low, the aggregate amounts discharged into the atmosphere may be sufficient to cause significant pollution problems. Reduction of $NO_x$ emissions is therefore an objective in the control of industrial and automotive pollution.

Various reducing agents such as ammonia, carbon monoxide, hydrogen, and hydrocarbons may be used to convert $NO_x$ to molecular nitrogen ($N_2$) in the presence of suitable catalysts. A number of metals and metal oxides are known to be catalytically active for the reaction, including platinum, rhodium, vanadium oxide, tungsten, and titanium oxide. See Bosch, H., et al., "Catalytic Reduction of Nitrogen Oxides—A Review of the Fundamentals of Technology," *Catalysis Today*, vol. 2, no. 4, 369–531 (1988). The metal component is conventionally supported on a porous carrier such as silica, alumina, zirconia, or a zeolite such as ZSM-5. See Groeneveld, M. J., et al., "Preparation, Characterization and Testing of New V/Ti/$SiO_2$ Catalysts for Denoxing and Evaluation of Shell Catalyst S-995," *Catalysis: Theory to Practice, Proceedings of the 9th International Congress on Catalysis*, vol. 4, 1743–1749 (1988). A number of $NO_x$ reduction processes are referred to in U.S. Pat. No. 4,929,586 (Hegedus). U.S. Pat. No. 4,778,665 (Krishnamurthy) discloses a selective catalytic reduction process using a catalyst comprising an intermediate pore size zeolite.

SUMMARY

There is provided a method for converting nitrogen oxides to nitrogen by contacting the nitrogen oxides with a reducing agent in the presence of a catalyst which is effective for the reduction of nitrogen oxides, said catalyst comprising an acidic solid comprising a Group IVB metal oxide modified with an oxyanion of a Group VIB metal and further comprising at least one metal selected from the group consisting of Group IB, Group IVA, Group VB, Group VIIB, Group VIII, rare earth metals and mixtures thereof.

There is also provided a method for pretreating prior to discharge to the atmosphere an exhaust gas contaminated with $NO_x$, which method comprises forming at a temperature of at least about 200° C. a mixture of ammonia and the exhaust gas in which the ammonia is present in an amount sufficient to effect reduction of $NO_x$ by reaction with the ammonia, and contacting the mixture at a temperature from about 200° C. to about 600° C. and at a gas hourly space velocity effective to reduce the $NO_x$ content with a selective reduction catalyst comprising an acidic solid comprising a Group IVB metal oxide modified with an oxyanion of a Group VIB metal and further comprising at least one metal selected from the group consisting of Group IB, Group IVA, Group VB, Group VIIB, Group VIII, rare earth metals and mixtures thereof.

EMBODIMENTS

The acidic solid material useful as a catalyst in the present process may be prepared in accordance with U.S. patent application Ser. Nos. 08/332,169, filed Oct. 31, 1994 (pending); 08/236,073, filed May 2, 1994 (pending); 08/143,716, filed Nov. 1, 1993 (abandoned); and 08/136,838, filed Oct. 18, 1993 (abandoned), the entire disclosures incorporated herein by reference.

The solid material described herein comprises an oxide of a Group IVB metal, preferably zirconia or titania. This Group IVB metal oxide is modified with an oxyanion of a Group VIB metal, such as an oxyanion of tungsten, such as tungstate. The modification of the Group IVB metal oxide with the oxyanion of the Group VIB metal imparts acid functionality to the material. The modification of a Group IVB metal oxide, particularly, zirconia, with a Group VIB metal oxyanion, particularly tungstate, is described in U.S. Pat. No. 5,113,034; in Japanese Kokai Patent Application No. Hei 1 [1989]-288339; and in an article by K. Arata and M. Hino in *Proceedings 9th International Congress on Catalysis*, Volume 4, pages 1727–1735 (1988), the entire disclosures of these publications are expressly incorporated herein by reference. According to these publications, tungstate is impregnated onto a preformed solid zirconia material.

For the purposes of the present disclosure, the expression, Group IVB metal oxide modified with an oxyanion of a Group VIB metal, is intended to connote a material comprising, by elemental analysis, a Group IVB metal, a Group VIB metal and oxygen, with more acidity than a simple mixture of separately formed Group IVB metal oxide mixed with a separately formed Group VIB metal oxide or oxyanion. The present Group IVB metal, e.g., zirconium, oxide modified with an oxyanion of a Group VIB metal, e.g., tungsten, is believed to result from an actual chemical interaction between a source of a Group IVB metal oxide and a source of a Group VIB metal oxide or oxyanion.

This chemical interaction is discussed in the aforementioned article by K. Arata and M. Hino in *Proceedings 9th International Congress on Catalysis*, Volume 4, pages 1727–1735 (1988). In this article, it is suggested that solid superacids are formed when sulfates are reacted with hydroxides or oxides of certain metals, e.g., Zr. These superacids are said to have the structure of a bidentate sulfate ion coordinated to the metal, e.g., Zr. In this article, it is further suggested that a superacid can also be formed when tungstates are reacted with hydroxides or oxides of Zr.

The resulting tungstate modified zirconia materials are theorized to have an analogous structure to the aforementioned superacids comprising sulfate and zirconium, wherein tungsten atoms replace sulfur atoms in the bidentate structure. It is further suggested that tungsten oxide combines with zirconium oxide compounds to create superacid sites at the time when the tetragonal phase is formed.

Although it is believed that the present catalysts may comprise the bidentate structure suggested in the aforementioned article by Arata and Hino, the particular structure of the catalytically active site in the present Group IVB metal oxide modified with an oxyanion of a Group VIB metal has not yet been confirmed, and it is not intended that this catalyst component should be limited to any particular structure.

Suitable sources of the Group IVB metal oxide, used for preparing the catalyst, include compounds capable of generating such oxides, such as oxychlorides, chlorides, nitrates, oxynitrates, etc., particularly of zirconium or titanium. Alkoxides of such metals may also be used as precursors or sources of the Group IVB metal oxide. Examples of such alkoxides include zirconium n-propoxide and titanium i-propoxide. These sources of a Group IVB metal oxide, particularly zirconia, may form zirconium hydroxide, i.e., $Zr(OH)_4$, or hydrated zirconia as intermediate species upon precipitation from an aqueous medium in the absence of a reactive source of tungstate. The expression, hydrated zirconia, is intended to connote materials comprising zirconium atoms covalently linked to other zirconium atoms via bridging oxygen atoms, i.e., Zr-O-Zr, further comprising available surface hydroxy groups. When hydrated zirconia is impregnated with a suitable source of tungstate under sufficient conditions, these available surface hydroxyl groups are believed to react with the source of tungstate to form an acidic catalyst. As suggested in the aforementioned article by K. Arata and M. Hino in *Proceedings 9th International Congress on Catalysis,* Volume 4, pages 1727–1735 (1988), precalcination of $Zr(OH)_4$ at a temperature of from about 100° C. to about 400° C. results in a species which interacts more favorably with tungstate upon impregnation therewith. This precalcination is believed to result in the condensation of ZrOH groups to form a polymeric zirconia species with surface hydroxyl groups. This polymeric species is referred to herein as a form of a hydrated zirconia. Suitable sources for the oxyanion of the Group VIB metal, preferably molybdenum or tungsten, include, but are not limited to, ammonium metatungstate or metamolybdate, tungsten or molybdenum chloride, tungsten or molybdenum carbonyl, tungstic or molybdic acid and sodium tungstate or molybdate.

The present catalyst may be prepared, for example, by impregnating the hydroxide or oxide, particularly the hydrated oxide, of the Group IVB metal with an aqueous solution containing an anion of the Group VIB metal, preferably tungstate or molybdate, followed by drying.

The present modified oxide material may also be prepared by treatment of a hydrated Group IVB metal oxide, such as hydrated zirconia, under sufficient hydrothermal conditions prior to contact with a source of a Group VIB metal oxyanion, such as tungstate. More particularly, refluxing hydrated zirconia in an aqueous solution having a pH of 7 or greater was beneficial. Without wishing to be bound by any theory, it is theorized that the hydrothermally treated, hydrated zirconia is better because it has higher surface area. It is also theoretically possible that the hydrothermal treatment alters surface hydroxyl groups on the hydrated zirconia, possibly in a manner which promotes a more desirable interaction with the source of tungstate later used.

The hydrothermal conditions may include a temperature of at least 50° C., e.g., at least 80° C., e.g., at least 100° C. The hydrothermal treatment may take place in a sealed vessel at greater than atmospheric pressure. However, a preferred mode of treatment involves the use of an open vessel under reflux conditions. Agitation of hydrated Group IVB metal oxide in the liquid medium, e.g., by the action of refluxing liquid and/or stirring, promotes the effective interaction of the hydrated oxide with the liquid medium. The duration of the contact of the hydrated oxide with the liquid medium may be at least 1 hour, e.g., at least 8 hours. The liquid medium for this treatment may have a pH of 7 or greater, e.g., 9 or greater. Suitable liquid mediums include water, hydroxide solutions (including hydroxides of $NH_4^+$, $Na^+$, $K^+$, $Mg^{2+}$, and $Ca^{2+}$), carbonate and bicarbonate solutions (including carbonates and bicarbonates of $NH_4^+$, $Na^+$, $K^+$, $Mg^{2+}$, and $Ca^{2+}$), pyridine and its derivatives, and alkyl/hydroxyl amines.

The present modified oxide material may also be prepared by combining a first liquid solution comprising a source of a Group IVB metal oxide with a second liquid solution comprising a source of an oxyanion of a Group VIB metal. This combination of two solutions then may be subjected to conditions sufficient to cause co-precipitation of the modified oxide material as a solid from the liquid medium. Alternatively, the source of the Group IVB metal oxide and the source of the oxyanion of the Group VIB metal may be combined in a single liquid solution. This solution may then be subjected to conditions sufficient to cause co-precipitation of the solid modified oxide material, such as by the addition of a precipitating reagent to the solution. Water is a preferred solvent for these solutions.

The temperature at which the liquid medium is maintained during the co-precipitation may be less than about 200° C., e.g., from about 0° C. to about 200° C. This liquid medium may be maintained at an ambient temperature (i.e., room temperature) or the liquid may be cooled or heated. A particular range of such temperatures is from about 25° C. to about 100° C.

The liquid medium from which the present catalyst components are co-precipitated may optionally comprise a solid support material, in which case the present catalyst may be co-precipitated directly onto the solid support material. Examples of such support materials include the material designated M41S, which is described in U.S. Pat. No. 5,102,643. A particular example of such an M41S material is a material designated MCM-41, which is described in U.S. Pat. No. 5,098,684.

Support materials and/or co-catalyst materials may also, optionally, be co-precipitated from the liquid medium along with the Group IVB metal oxide and the oxyanion of the Group VIB metal. An example of a co-catalyst material is a metal component.

According to the modification of the solid material described herein, a metal component is combined with the material. This metal component improves the catalytic properties of the catalyst of the present invention.

Examples of metal components include the oxide, hydroxide or free metal (i.e., zero valent) forms of Group VIII metals (i.e., Pt, Pd, Ir, Rh, Os, Ru, Ni, Co and Fe), Group IVA metals (i.e., Sn and Pb), Group VB metals (i.e., Sb and Bi), Group VIIB metals (i.e., Mn, Tc and Re), rare earth metals (Ce), and Group IB metals (Cu). The present catalyst may comprise one or more catalytic forms of one or more noble metals (i.e., Pt, Pd, Ir, Rh, Os or Ru). Combinations of catalytic forms of such noble or non-noble metals, such as combinations of Pt with Sn, may be used. The valence state of the metal of the metal component is preferably in a reduced valance state, e.g., when this component is in the form of an oxide or hydroxide. The reduced valence state of this metal may be attained, in situ, during the course of a reaction, when a reducing agent, such as hydrogen, is included in the feed to the reaction.

Other elements, such as alkali (Group IA) and alkaline earth (Group IIA) compounds may be added to or coprecipitated with the present catalyst to alter catalytic properties. The addition of such alkali or alkaline earth compounds to the present catalyst may enhance the catalytic properties of components thereof, e.g., Pt or W.

The Group IVB metal (i.e., Ti, Zr or Hf) and the Group VIB metal (i.e., Cr, Mo or W) species of the present catalyst are not limited to any particular valence state for these species. These species may be present in this catalyst in any possible positive oxidation value for these species. The modified acidic oxide may be contacted with hydrogen at elevated temperatures. These elevated temperatures may be 100° C. or greater, e.g., 250° C. or greater, e.g., about 300° C. The duration of this contact may be as short as one hour or even 0.1 hour. However, extended contact may also be used. This extended contact may take place for a period of 6 hours or greater, e.g., about 18 hours. When zirconia is modified with tungstate and then contacted with hydrogen at elevated temperatures, an increase in catalytic activity, e.g., for paraffin isomerization, has been observed. The modified acidic oxide may be contacted with hydrogen in the presence or absence of a hydrocarbon cofeed. For example, the activity of the catalyst may be increased, in situ, during the course of a reaction, such as hydrocracking, when a hydrocarbon and hydrogen are passed over the catalyst at elevated temperatures.

The metal component of the present catalyst may be derived from Group VIII metals, such as platinum, iridium, osmium, palladium, rhodium, ruthenium, nickel, cobalt, iron and mixtures of two or more thereof. Optional components of the present catalyst, which may be used alone or mixed with the above-mentioned metal components, may be derived from Group IVA metals, preferably Sn, and/or components derived from Group VIIB metals, preferably rhenium and manganese. These components may be added to the catalyst by methods known in the art, such as ion exchange, impregnation or physical admixture. For example, salt solutions of these metals may be contacted with the remaining catalyst components under conditions sufficient to combine the respective components. The metal containing salt is preferably water soluble. Examples of such salts include chloroplatinic acid, tetraammineplatinum complexes, platinum chloride, tin sulfate and tin chloride. The components may also be co-precipitated along with the other components of the modified oxide material.

The present modified oxide material may be recovered by filtration from the liquid medium, followed by drying. Calcination of the resulting material may be carried out, preferably in an oxidizing atmosphere, at temperatures from about 500° C. to about 900° C., preferably from about 700° C. to about 850° C., and more preferably from about 750° C. to about 825° C. The calcination time may be up to 48 hours, preferably for about 0.1–24 hours, and more preferably for about 1.0–10 hours. In a most preferred embodiment, calcination is carried out at about 800° C. for about 1 to about 3 hours. The optional components of the catalyst (e.g., Group VIII metal, Group VIIB metal, etc.) may be added after or before the calcination step by techniques known in the art, such as impregnation, co-impregnation, co-precipitation, physical admixture, etc. The components, e.g., the metal component, may also be combined with the remaining catalyst components before or after these remaining components are combined with a binder or matrix material as described hereinafter.

In the present catalyst, of the Group IVB oxides, zirconium oxide is preferred; of the Group VIB anions, tungstate is preferred; and of the metal components, iron is preferred.

Qualitatively speaking, elemental analysis of the present acidic solid will reveal the presence of Group IVB metal, Group VIB metal and oxygen. The amount of oxygen measured in such an analysis will depend on a number of factors, such as the valence state of the Group IVB and Group VIB metals, the metal component, moisture content, etc. Accordingly, in characterizing the composition of the present catalyst, it is best not to be restricted by any particular quantities of oxygen. In functional terms, the amount of Group VIB oxyanion in the present catalyst may be expressed as that amount which increases the acidity of the Group IVB oxide. This amount is referred to herein as an acidity increasing amount. Elemental analysis of the present catalyst may be used to determine the relative amounts of Group IVB metal and Group VIB metal in the catalyst. From these amounts, mole ratios in the form of $XO_2/YO_3$ may be calculated, where X is said Group IVB metal, assumed to be in the form $XO_2$, and Y is said Group VIB metal, assumed to be in the form of $YO_3$. It will be appreciated, however, that these forms of oxides, i.e., $XO_2$ and $YO_3$, may not actually exist, and are referred to herein simply for the purposes of calculating relative quantities of X and Y in the present catalyst. The present catalysts may have calculated mole ratios, expressed in the form of $XO_2/YO_3$, where X is at least one Group IVB metal (i.e., Ti, Zr, and Hf) and Y is at least one Group VIB metal (i.e., Cr, Mo, or W), of up to 1000, e.g., up to 300, e.g., from 2 to 100, e.g., from 4 to 30.

The amount of iron and/or manganese which is incorporated into the present acidic solid may also be expressed in terms of calculated mole ratios of oxides, based upon the elemental analysis of the solid for the Group IVB metal, X, along with Mn and Fe. More particularly, this acidic solid may have a calculated mole ratio, expressed in terms of $XO_2/(MnO_2+Fe_2O_3)$, of, for example, from 10 to 500. It will be appreciated, however, that Mn need not necessarily be in the form of $MnO_2$, and Fe need not be in the form of $Fe_2O_3$. More particularly, at least a portion of these components may be in the form of free metals or other combined forms than $MnO_2$ or $Fe_2O_3$ e.g., as salts with elements other than oxygen, in any possible valence state for X, Mn, or Fe. Accordingly, it will be understood that the expression, $XO_2/(MnO_2+Fe_2O_3)$, is given merely for the purposes of expressing calculated quantities of X, Mn, and Fe, and is not to be construed as being limited of the actual form of these elements in the present acidic solid material.

The amount of metal component may be that amount which imparts or increases the catalytic ability of the overall material to catalytically convert nitrogen oxide to nitrogen. This amount is referred to herein as a catalytic amount. Quantitatively speaking, the present catalyst may comprise, for example, from about 0.001 to about 5 wt %, e.g., from about 0.1 to about 2 wt %, of the metal component, especially when this component is a noble metal.

The present catalyst is acidic and may be observed as being highly acidic, even to the extent of being a superacid. Superacids are a known class of acidic materials which have an acidity greater than that of 100% $H_2SO_4$. This level of acidity may be determined by any appropriate means, including the use of suitable indicators, the determination of the ability to protonate certain chemicals, and/or the determination of the ability to stabilize certain cations, especially certain carbonium or carbenium ions. For example, this catalyst, whether analyzed in the presence or absence of the metal components and/or binder materials, may have an acid strength of a superacid as measured by the color change of an appropriate indicator, such as the Hammett indicator. More particularly, the Ho acid strength of the present catalyst may have a value of less than —13, i.e., an "acid strength" of greater than —13. The use of Hammett indicators to measure the acidity of solid superacids is discussed in the Soled et al. U.S. Pat. No. 5,157,199. This Soled et al. patent also describes the Ho acid strength for certain sulfated transition metal superacids.

The catalyst described herein may be used to convert nitrogen oxides to nitrogen. This reaction is carried out with a reducing agent such as but not limited to ammonia, carbon monoxide, urea, hydrocarbons, hydrogen cyanide, or hydrogen, but ammonia is preferred, and the process is described below with reference to the use of ammonia as the reducing agent for convenience and brevity. The process is, however, applicable to other gaseous reducing agents with appropriate changes in the stoichiometry. The reaction is typically carried out at a temperature above about 200° C. at ambient pressures.

The gases containing the nitrogen oxides ($NO_x$) arise from various combustion processes in which high temperatures occur. Industrial boilers, furnaces, incinerators all contribute to $NO_x$ emissions, and in general fuel-rich combustion processes produce exhaust gases with lower concentrations of $NO_x$ than do lean mixtures. The necessity to achieve combustion which is efficient in terms of fuel consumption, however, favors the use of stoichiometric or near-stoichiometric fuel/air ratios which therefore tend to promote $NO_x$ formation. The trend of many current processes is, therefore, towards greater $NO_x$ emissions. Emissions may also arise from the general nature of the process as, for example, in the regeneration of fluid catalytic cracking (FCC) catalysts where high temperatures frequently result from the combustion of coke and/or carbon monoxide (CO). A representative exhaust gas composition from the regenerator of an FCCU is as follows.

| Constituent | Wt. % |
|---|---|
| $CO_2$ | 12 |
| $O_2$ | 2 |
| $H_2O$ | 15 |
| $N_2$ | 71 |
| | u ppm (v/v) |
| $SO_2$ | 410 |
| $SO_3$ | 70 |
| $NO_x$ | 200 |
| CO | 1500 |

Chemical processes are also productive of $NO_x$ emissions including, for example, the manufacture of nitric acid, nitration of organic chemicals, the calcination of solid metal nitrate salts to form oxides, as well as other chemical operations such as the reprocessing of spent nuclear fuel rods by the solution in the nitric acid to form uranyl nitrate which is then calcined to convert the nitrate to uranium oxide. The present process is effective for the removal of nitrogen oxides regardless of their origin.

Taking ammonia, the preferred species, as an example, the reduction of $NO_x$ in the absence of oxygen can be postulated to take place approximately according to the stoichiometry defined by Equations (1) and (2) below.

$$6NO_2+8NH_3 \rightarrow 7N_2+12H_2O \quad (1)$$

$$6NO+4NH_3 \rightarrow 5N_2+6H_2O \quad (2)$$

In the presence of oxygen, the approximate stoichiometry is similarly $$2NO_2+4NH_3+O_2 \rightarrow 3N_2+6H_2O \quad (3)$$

$$4NO+4NH_3+O_2 \rightarrow 4N_2+6H_2O \quad (4)$$

In the operation of the present process, the stoichiometry dictated by the above equations need not be followed although, of course, the amount of reducing agent present should be sufficient to effect the desired reduction in the nitrogen oxides which are present in the gases being treated. This amount will vary, of course, on the nature of the reducing agent, the composition of the gases being treated ($NO:NO_x$ ratio), and, as indicated above for the case of ammonia, whether oxygen is present. In any event, the ratio of reducing agent to the nitrogen oxides for the desired degree of reduction is preferably determined empirically, taking into account the factors set out above including the approximate stoichiometry, since the mechanism and reaction paths for $NO_x$ reduction are not known exactly.

Contact between the $NO_x$ and the reducing agent in the presence of the selected catalyst may be conducted at a temperature of 200° C. to about 600° C., and preferably at about 250° C. to about 550° C., and at a gas hourly space velocity (vols. of gas at STP per volume of catalyst per hour) adjusted to provide the desired conversion. The GHSV can be from about 1000 to 1,000,000 $hr^{-1}$, and preferably from 50,000 to about 800,000 $hr^{-1}$. In general, since the reaction is exothermic but low concentrations of $NO_x$ are present, adequate temperature control is readily achieved with a simple stationary, fixed bed of catalyst. However, other contacting techniques may be used such as with a fixed fluid bed, a transport bed, and a monolithic catalyst structure such as a honeycomb. The process is operable at subatmospheric to superatmospheric pressure, e.g., at 5 to 500 psia, and preferably at 10 to 50 psia, i.e., near atmospheric pressure.

It may be desirable to incorporate the present catalyst with another material to improve its properties. Such materials include active and inactive materials and synthetic or naturally occurring zeolites as well as inorganic materials such as clays, silica, and/or metal oxides. The latter may be either naturally occurring or in the form of gelatinous precipitates, sols, or gels including mixtures of silica and metal oxides.

It is noted that the present catalyst need not contain any sulfate ion (U.S. Pat. No. 4,918,041), and therefore is expected to be more stable and also to be much easier to regenerate than sulfated catalysts.

The present catalyst can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the catalyst can be extruded before drying or partially dried and then extruded. The present catalyst can also be formed into a monolith or wash coated on to a monolith surface. The present catalyst may be composited with a matrix material to form the finished form of the catalyst and for this purpose conventional matrix materials such as alumina, silica-alumina and silica are suitable with preference given to silica as a non-acidic binder. Other binder materials may be used, for example, titania, zirconia and other metal oxides or clays. The active catalyst may be composited with the matrix in amounts from 80:20 to 20:80 by weight, e.g., from 80:20 to 50:50 active catalyst:matrix. Compositing may be done by conventional means including mulling the materials together followed by extrusion of pelletizing into the desired finished catalyst particles.

The following examples illustrate the process of the present invention.

Catalyst A

Five hundred grams of $ZrOCl_2.8H_2O$ were dissolved with stirring in 7 liters of distilled water. A solution containing 263 grams of conc. $NH_4OH$, 500 mL of distilled $H_2O$, and 54 grams of $(NH_4)_6H_2W_{12}O_{40}.xH_2O$ was added dropwise over a 30–45 minute period. The pH of the final composite was adjusted to approximately 9 by the addition of concentrated ammonium hydroxide. This slurry was then put in polypropylene bottles and placed in a steambox (100° C.) for 72 hours. The product formed was recovered by filtration, washed with excess water, and dried overnight at 85° C. The material was then calcined in air to 825° C. for 3 hours. The elemental analyses of the calcined material was W, 15.9% (by weight); Zr, 58.6%; Ash (1000° C.), 96.7.

Catalyst B (Cerium)

Five hundred grams of $ZrOCl_2.8H_2O$ were dissolved with stirring in 6.5 liters of distilled water. To the zirconyl chloride solution was added a mixture of 3.6 grams of $Ce(SO_4)_2$ dissolved in 500 ml of distilled water. A solution containing 263 grams of conc. $NH_4OH$, 500 mL of distilled $H_2O$, and 54 grams of $(NH_4)_6H_2W_{12}O_{40}.xH_2O$ was added dropwise over a 30–45 minute period. The pH of the final composite was adjusted to approximately 9 by the addition of concentrated ammonium hydroxide. This slurry was then put in polypropylene bottles and placed in a steambox (100° C.) for 72 hours. The product formed was recovered by filtration, washed with excess water, and dried overnight at 85° C. The material was then calcined in air to 825° C. for 3 hours. The elemental analyses of the calcined material was W, 16.0% (by weight); Zr, 57.3%; Ce, 0.42%; Ash (1000° C.), 97.5.

Catalyst C (Nickel)

Five hundred grams of $ZrOCl_2.8H_2O$ were dissolved with stirring in 6.5 liters of distilled water. To the zirconyl chloride solution was added a mixture of 7.9 grams of $Ni(NO_3)_2.6H_2O$ dissolved in 500 ml of distilled water. A solution containing 263 grams of conc. $NH_4OH$, 500 mL of distilled $H_2O$, and 54 grams of $(NH_4)_6H_2W_{12}O_{40}.xH_2O$ was added dropwise over a 30–45 minute period. The pH of the final composite was adjusted to approximately 9 by the addition of concentrated ammonium hydroxide. This slurry was then put in polypropylene bottles and placed in a steambox (100° C.) for 72 hours. The product formed was recovered by filtration, washed with excess water, and dried overnight at 85° C. The material was then calcined in air to 825° C. for 3 hours. The elemental analyses of the calcined material was W, 14.8% (by weight); Zr, 50.8%; Ni, 0.60%; Ash (1000° C.), 97.6.

Catalyst D (Iron)

Five hundred grams of $ZrOCl_2.8H_2O$ were dissolved with stirring in 6.5 liters of distilled water. To the zirconyl chloride solution was added a mixture of 30.1 grams of $FeSO_4.7H_2O$ dissolved in 500 ml of distilled water. A solution containing 263 grams of conc. $NH_4OH$, 500 mL of distilled $H_2O$, and 54 grams of $(NH_4)_6H_2W_{12}O_{40}.xH_2O$ was added dropwise over a 30–45 minute period. The pH of the final composite was adjusted to approximately 9 by the addition of concentrated ammonium hydroxide. This slurry was then put in polypropylene bottles and placed in a steambox (100° C.) for 72 hours. The product formed was recovered by filtration, washed with excess water, and dried overnight at 85° C. The material was then calcined in air to 825° C. for 3 hours. The elemental analyses of the calcined material was W, 16.7% (by weight); Zr, 51.9%; Fe, 3.27%; Ash (1000° C.), 97.9.

Catalyst E (Iron)

Five hundred grams of $ZrOCl_2.8H_2O$ were dissolved with stirring in 6.5 liters of distilled water. To the zirconyl chloride solution was added a mixture of 7.5 grams of $FeSO_4.7H_2O$ dissolved in 500 ml of distilled water. A solution containing 263 grams of conc. $NH_4OH$, 500 mL of distilled $H_2O$, and 54 grams of $(NH_4)_6H_2W_{12}O_{40}.xH_2O$ was added dropwise over a 30–45 minute period. The pH of the final composite was adjusted to approximately 9 by the addition of concentrated ammonium hydroxide. This slurry was then put in polypropylene bottles and placed in a steambox (100° C.) for 72 hours. The product formed was recovered by filtration, washed with excess water, and dried overnight at 85° C. The material was then calcined in air to 825° C. for 3 hours. The elemental analyses of the calcined material was W, 14.8% (by weight); Zr, 54.9%; Fe, 0.72%; Ash (1000° C.), 96.7.

Catalyst F (Iron/Manganese)

Five hundred grams of $ZrOCl_2.8H_2O$ were dissolved with stirring in 6.5 liters of distilled water. To the zirconyl chloride solution was added a mixture of 7.5 grams of $FeSO_4.7H_2O$ and 4.6 grams of $MnSO_4.H_2O$ dissolved in 500 ml of distilled water. A solution containing 263 grams of conc. $NH_4OH$, 500 mL of distilled $H_2O$, and 54 grams of $(NH_4)_6H_2W_{12}O_{40}.xH_2O$ was added dropwise over a 30–45 minute period. The pH of the final composite was adjusted to approximately 9 by the addition of concentrated ammonium hydroxide. This slurry was then put in polypropylene bottles and placed in a steambox (100° C.) for 72 hours. The product formed was recovered by filtration, washed with excess water, and dried overnight at 85° C. The material was then calcined in air to 825° C. for 3 hours. The elemental analyses of the calcined material was W, 15.7% (by weight); Zr, 53.0%; Fe, 0.81%; Mn, 0.73; Ash (1000° C.), 99.3.

Catalyst G (Tin)

Five hundred grams of $ZrOCl_2.8H_2O$ were dissolved with stirring in 6.5 liters of distilled water. To the zirconyl chloride solution was added a mixture of 4.1 grams of Sn(SO$_4$)$_2$.xH$_2$O dissolved in 500 ml of distilled water. A solution containing 263 grams of conc. NH$_4$OH, 500 mL of distilled H$_2$O, and 54 grams of (NH$_4$)$_6$H$_2$W$_{12}$O$_{40}$.xH$_2$O was added dropwise over a 30–45 minute period. The pH of the final composite was adjusted to approximately 9 by the addition of concentrated ammonium hydroxide. This slurry was then put in polypropylene bottles and placed in a steambox (100° C.) for 72 hours. The product formed was recovered by filtration, washed with excess water, and dried overnight at 85° C. The material was then calcined in air to 825° C. for 3 hours. The elemental analyses of the calcined material was W, 17.5% (by weight); Zr, 59.2%; Sn, 0.33%; Ash (1000° C.), 99.7.

Catalyst H (Copper)

Five hundred grams of ZrOCl$_2$.8H$_2$O were dissolved with stirring in 6.5 liters of distilled water. To the zirconyl chloride solution was added a mixture of 6.7 grams of CuSO$_4$.5H$_2$O dissolved in 500 ml of distilled water. A solution containing 263 grams of conc. NH$_4$OH, 500 mL of distilled H$_2$O, and 54 grams of (NH$_4$)$_6$H$_2$W$_{12}$O$_{40}$.xH$_2$O was added dropwise over a 30–45 minute period. The pH of the final composite was adjusted to approximately 9 by the addition of concentrated ammonium hydroxide. This slurry was then put in polypropylene bottles and placed in a steambox (100° C.) for 72 hours. The product formed was recovered by filtration, washed with excess water, and dried overnight at 85° C. The material was then calcined in air to 825° C. for 3 hours.

Examples 1–8

These examples describe the activity of catalysts A–H for the selective reduction of nitric oxides (NO$_x$). The results are summarized in Table 1, and presented in more detail in Table 2, below. All the experiments were conducted in a fixed-bed reactor by passing a helium gas stream, containing 500 ppm NO, 1% O$_2$ and 500 ppm NH$_3$, over the metal-modified WO$_x$/ZrO$_2$ catalysts. Typically, 0.05 g of catalyst was used. The space velocity (GHSV) was approximately 800,000 hr$^{-1}$.

TABLE 1

Relative Rate of the Selective Catalytic Reduction (SCR) of Nitric Oxides over WO$_x$/ZrO$_2$-based catalysts

| Example | Catalyst | Relative Rate at 400° C. |
|---|---|---|
| 1 | A | 1.0 |
| 2 | B | 2.4 |
| 3 | C | 1.2 |
| 4 | D | 9.4 |
| 5 | E | 4.8 |
| 6 | F | 2.9 |
| 7 | G | 1.4 |
| 8 | H | 2.8 |

TABLE 2

|  | Example 1 Catalyst A | Example 2 Catalyst B | Example 3 Catalyst C | Example 4 Catalyst D | Example 5 Catalyst E | Example 6 Catalyst F | Example 7 Catalyst G | Example 8 Catalyst H |
|---|---|---|---|---|---|---|---|---|
| % Conversion | | | | | | | | |
| 300° C. | 0.5 | 1.7 | 0.4 | 17.9 | 4.6 | 1.8 | 0.4 | 2.7 |
| 350° C. | 1.7 | 6.2 | 2.4 | 36.5 | 15.2 | 7.4 | 2.1 | 7.7 |
| 400° C. | 6.4 | 15.0 | 7.4 | 50.3 | 28.4 | 17.4 | 8.5 | 16.3 |
| 450° C. | 14.0 | 24.8 | 16.0 | 57.7 | 42.6 | 23.6 | 16.1 | 27.1 |
| 500° C. | 21.0 | 32.0 | 24.8 | 60.1 | 50.6 | 32.4 | 21.7 | 27.7 |
| N$_2$ Formation rate (mol/g/s) × 10$^8$ | | | | | | | | |
| 300° C. | 1.5 | 5.48 | 1.48 | 63.4 | 15.5 | 5.92 | 1.22 | 9.43 |
| 350° C. | 5.61 | 20.5 | 8.42 | 137 | 52.5 | 24.9 | 7.06 | 27.1 |
| 400° C. | 21.1 | 50.6 | 26.1 | 199 | 102 | 60.3 | 29.4 | 58.7 |
| 450° C. | 47.2 | 86.2 | 57.6 | 236 | 161 | 83.3 | 56.8 | 101 |
| 500° C. | 72.2 | 114 | 91.6 | 249 | 197 | 118 | 77.8 | 103 |
| N$_2$O (ppm) | | | | | | | | |
| 300° C. | 2.0 | 1.9 | 1.8 | 1.7 | 0.0 | 0.0 | 1.9 | 2.5 |
| 350° C. | 3.1 | 2.6 | 3.0 | 2.7 | 1.5 | 1.6 | 3 | 5.2 |
| 400° C. | 5.3 | 3.5 | 6.2 | 4.3 | 1.8 | 1.8 | 4.9 | 12.2 |
| 450° C. | 7.0 | 4.3 | 9.0 | 6.1 | 2.8 | 2.3 | 6 | 26 |
| 500° C. | 8.4 | 6.5 | 10.1 | 9.8 | 5.4 | 4.1 | 7 | 28 |
| Oxidation (ppm NH$_3$ converted to NO) | | | | | | | | |
| 300° C. | 0 | 0 | 0 | 0 | 0 | 0 | 0 | 0 |
| 350° C. | 0 | 0 | 0 | 0 | 0 | 0 | 0 | 0 |
| 400° C. | 0 | 0 | 1 | 0 | 0 | 0 | 4 | ? |
| 450° C. | 0 | 0 | 2 | 0 | 0 | 0 | 13 | 31 |
| 500° C. | 5 | 0 | 5 | ? | ? | ? | 26 | 82 |

Results presented in Table 1 clearly indicate the superior activity of the metal modified WO$_x$/ZrO$_2$ catalysts (Examples 2–8) vs the metal-free WO$_x$/ZrO$_2$ catalyst (Example 1). Table 1 also indicates that the Fe-containing catalysts exhibit the highest activity for NO$_x$ reduction (Examples 4 and 5).

What is claimed is:

1. A method for converting nitrogen oxides to nitrogen by contacting the nitrogen oxides with a reducing agent in the presence of a catalyst which is effective for the reduction of nitrogen oxides, said catalyst consisting essentially an acidic solid component comprising a Group IVB metal oxide modified with an oxyanion of a Group VIB metal and further containing at least one metal selected from the group consisting of Group IB, Group IVA, Group VB, Group VIIB, Group VIII, and mixtures thereof.

2. The method of claim 1, wherein said at least one metal is selected from the group consisting of nickel, iron, manganese, tin, copper, ruthenium and mixtures thereof.

3. The method of claim 1, wherein said at least one metal is iron.

4. A method according to claim 1, wherein said Group IVB metal is zirconium and said Group VIB metal is tungsten.

5. A method according to claim 1 in which the catalyst comprises the acidic solid component and a binder selected from alumina, silica, silica-alumina or naturally occurring clays.

6. A method according to claim 1 in which the nitrogen oxides are reduced with the reducing agent at temperature of at least 200° C.

7. A method according to claim 6 in which the nitrogen oxides are reduced with the reducing agent at a temperature from about 300° to 500° C.

8. A method according to claim 1 in which the reducing agent comprises ammonia.

9. A method according to claim 1 in which the reduction is carried out in the presence of oxygen.

10. A method according to claim 1 in which the reduction is carried out in the absence of oxygen.

11. A method according to claim 1 in which the reducing agent comprises carbon monoxide and/or hydrocarbon.

12. A method according to claim 1 in which the nitrogen oxides are formed by the regeneration of a coked fluid catalytic cracking catalyst used in the catalytic cracking of a petroleum fraction.

13. A method for pretreating prior to discharge to the atmosphere an exhaust gas contaminated with $NO_x$, which method comprises forming at a temperature of at least about 200° C. a mixture of ammonia and the exhaust gas in which the ammonia is present in an amount sufficient to effect reduction of $NO_x$ by reaction with the ammonia, and contacting the mixture at a temperature from about 200° C. to about 600° C. and at a gas hourly space velocity effective to reduce the $NO_x$ content with a selective reduction catalyst consisting essentially of an acidic solid comprising a Group IVB metal oxide modified with an oxyanion of a Group VIB metal and further containing at least one metal selected from the group consisting of Group IB, Group IVA, Group VB, Group VIIB, Group VIII, and mixtures thereof.

14. A method according to claim 13, wherein said Group IVB metal is zirconium and said Group VIB metal is tungsten.

* * * * *